(12) United States Patent
Lim et al.

(10) Patent No.: US 11,130,126 B2
(45) Date of Patent: Sep. 28, 2021

(54) SLIDING TYPE REPLACEABLE FLUID ANALYSIS CHAMBER MODULE

(71) Applicant: Kookmin University Industry Academy Cooperation Foundation, Seoul (KR)

(72) Inventors: Si Hyung Lim, Seoul (KR); Jang Hyeon Lee, Seoul (KR); Yeong Seok Lee, Seoul (KR); Ae Ran Song, Seocho-gu (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 272 days.

(21) Appl. No.: 16/521,402

(22) Filed: Jul. 24, 2019

(65) Prior Publication Data

US 2020/0261908 A1 Aug. 20, 2020

(30) Foreign Application Priority Data

Feb. 15, 2019 (KR) ........................ 10-2019-0018063

(51) Int. Cl.
*B01L 3/00* (2006.01)
*G01N 27/403* (2006.01)

(52) U.S. Cl.
CPC ..... *B01L 3/502715* (2013.01); *B01L 3/50273* (2013.01); *G01N 27/403* (2013.01); *B01L 2300/0809* (2013.01)

(58) Field of Classification Search
CPC ....... B01L 2200/028; B01L 2200/0689; B01L 2300/043; B01L 2300/0627; B01L 2300/0809; B01L 3/502715; B01L 3/50273; G01N 27/403
See application file for complete search history.

(56) References Cited

U.S. PATENT DOCUMENTS 5,133,937 A * 7/1992 Frackleton ............. B01L 3/502
422/67

* cited by examiner

*Primary Examiner* — Jennifer Wecker
*Assistant Examiner* — Jonathan Bortoli
(74) *Attorney, Agent, or Firm* — Osha Bergman Watanabe & Burton LLP

(57) ABSTRACT

There is provided a fluid analysis chamber module that allows an analysis element to be replaced in a sliding manner. The module includes a middle body, an upper body, and a lower body, in which the upper body and the lower body are rotated to be in contact with an upper surface and a lower surface of the middle body and to release from the contact state. The middle body provides a chamber hole where a tray with the analysis element seated thereon can be mounted. The middle body is provided on its front end with a tray receiving opening through which the tray is mounted into the chamber hole. When the upper body and lower body are rotated to be in contact with the upper surface and the lower surface, respectively, the chamber hole is closed, a fluid supplying line and discharging line are sealed, pogo pins for power supply and signal transmission are contacted to electrodes of the analysis element.

5 Claims, 7 Drawing Sheets

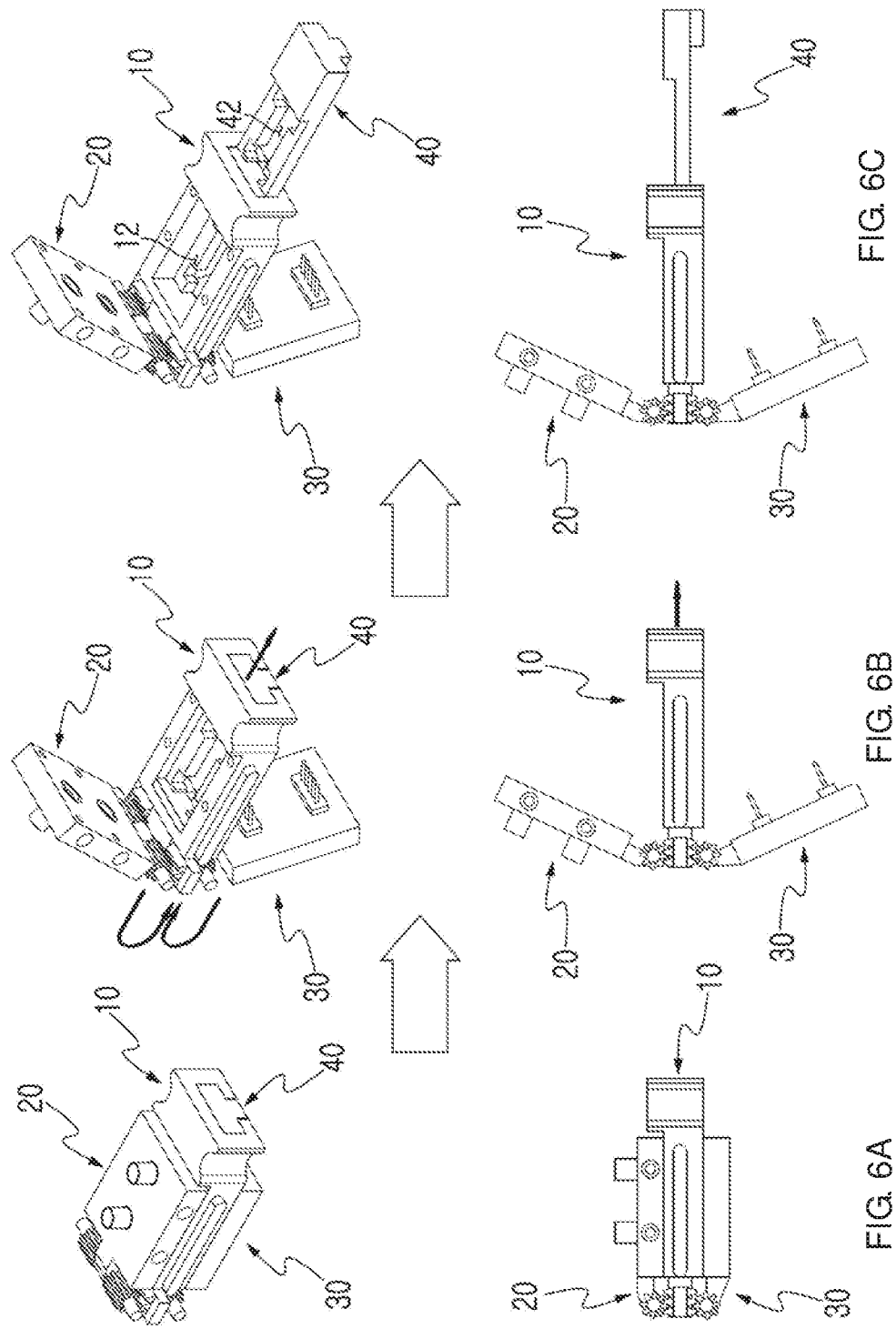

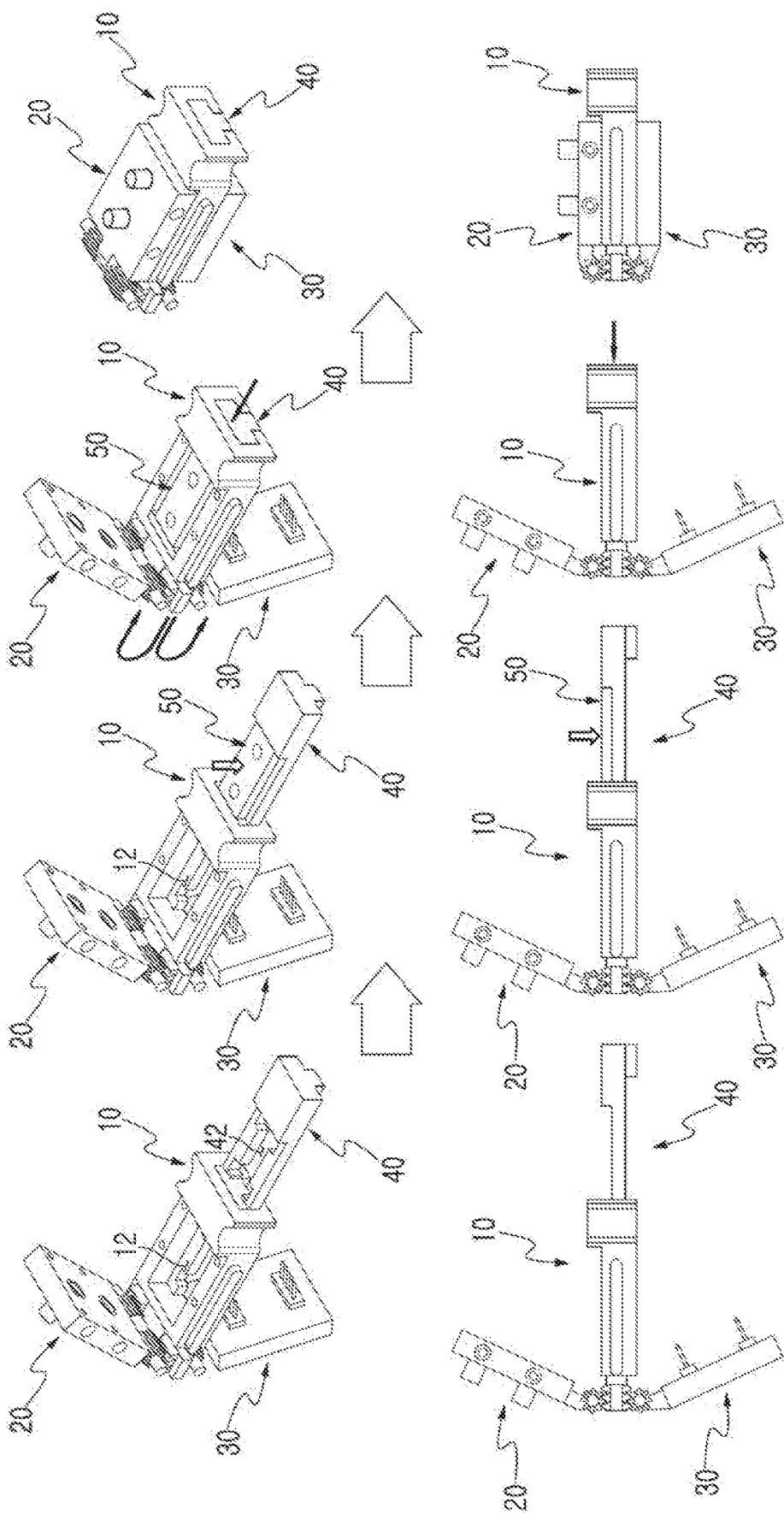

SLIDING TYPE REPLACEABLE FLUID ANALYSIS CHAMBER MODULE

CLAIM FOR PRIORITY

This application claims priority to Korean Patent Applications No. 10-2019-0018063 filed on Feb. 15, 2019 in the Korean Intellectual Property Office (KIPO), the entire contents of which are hereby incorporated by reference.

BACKGROUND

1. Technical Field

The present invention relates to a fluid analysis chamber module, and more particularly, to a fluid analysis chamber module in which an analysis element is easily inserted and detached and by which an analysis system can be easily constructed.

2. Related Art

Volatile organic compounds are easily vaporized into the atmosphere because of high vapor pressure, and they are present in low concentrations in the atmosphere and respiratory gases. These volatile organic compounds are known as toxic compounds that are carcinogenic and air pollutants, but they are generally difficult to detect because they are present in low concentrations.

Therefore, in order to detect a trace amount of gas, a special fluid analysis tool is usually used. Traditional fluid analysis systems that have been widely used have been built using analysis elements with the necessary elements. Such a system is fabricated, for example, by placing a material such as carbon foam in a chamber housing to form an analysis element and connecting the analysis element to the electrodes of other elements by wire bonding for power supply and signal control. That is, there is a disadvantage that it is necessary to fabricate a sealed chamber and to perform work such as wire bonding all the time, and once used analysis element cannot be reused, and it is difficult to construct such an analytical system in every analysis.

SUMMARY

Accordingly, the present invention provides a fluid analysis chamber module in which an analysis element can be easily replaced. The present invention provides a fluid analysis chamber module in which the analysis element can be replaced in a sliding manner.

The present invention provides a fluid analysis chamber module, which comprises a middle body having a chamber hole opened in a vertical direction at a central portion of an upper surface thereof and having a tray receiving opening disposed at a front end thereof; a tray having an analysis element seat on an upper surface thereof and capable of being inserted into the chamber hole in a sliding manner through the tray receiving opening so that the seated analysis element is located in the chamber hole; an analysis element having a housing with a fluid inlet and an outlet formed on an upper surface thereof; an upper body configured to be movable between a closed position in which the upper body is being in contact with the upper surface of the middle body and an open position and having a fluid inlet and outlet port units which are each hermetically connected to the fluid inlet and outlet of the analysis element inserted in the chamber hole when in the closed position; and a lower body configured to be movable between a closed position in which the lower body is being in contact with the lower surface of the middle body and an open position.

The lower body may include pogo pins disposed on an upper surface thereof, which may be connected to the analysis element when the lower body is in the closed position.

The middle body may further include rack gears provided on an upper surface and a lower surface of a rear end, respectively, wherein the upper body and the lower body each include a pinion gear that is engaged with each of the rack gears so as to be capable of gearing, wherein the upper body and the lower body rotate through a gear engagement and move between respective closed and open positions.

Sealing members may be disposed at lower ends of the fluid inlet and outlet port units to maintain a sealing when the fluid inlet and outlet port units are in fluid communication with the fluid inlet and the fluid outlet of the housing of the analysis element, respectively.

The fluid analysis chamber module may further comprise magnet members disposed in two or more of the middle body, the upper body, and the lower body, the magnet members being configured to maintain the closed positions when the upper body and the lower body are in the closed positions thereof.

According to the present invention, a fluid analysis chamber module is provided in which the mounting and replacement of an analysis element can be easily performed. In the fluid analysis chamber module, the analysis element can be placed on a tray and inserted and mounted in a sliding manner in the middle body through a tray receiving opening connected to the chamber hole. The analysis element can be demounted in a reverse manner, and a new analysis element can be easily mounted in the same inserting and mounting procedure. In particular, unlike conventional systems or apparatuses that need chamber sealing and wire bonding each time a system is built, in the fluid analysis chamber module according to the present invention, chamber sealing and connection for power/signal can be automatically accomplished when the analysis element is mounted. Further, the fluid analysis chamber module of the present invention employs a locking configuration using a magnet member, so that the sealed and connected state can be stably maintained during use. Such a fluid analysis chamber module can be advantageously used for detection/analysis of gaseous/liquid phase fluid.

BRIEF DESCRIPTION OF DRAWINGS

Example embodiments of the present invention will become more apparent by describing in detail example embodiments of the present invention with reference to the accompanying drawings, in which:

FIGS. 6A-C and 7A-D are views for illustrating the operation of mounting the analysis element in the fluid analysis chamber module according to a preferred embodiment of the present invention.

DESCRIPTION OF EXAMPLE EMBODIMENTS

Figure 1:
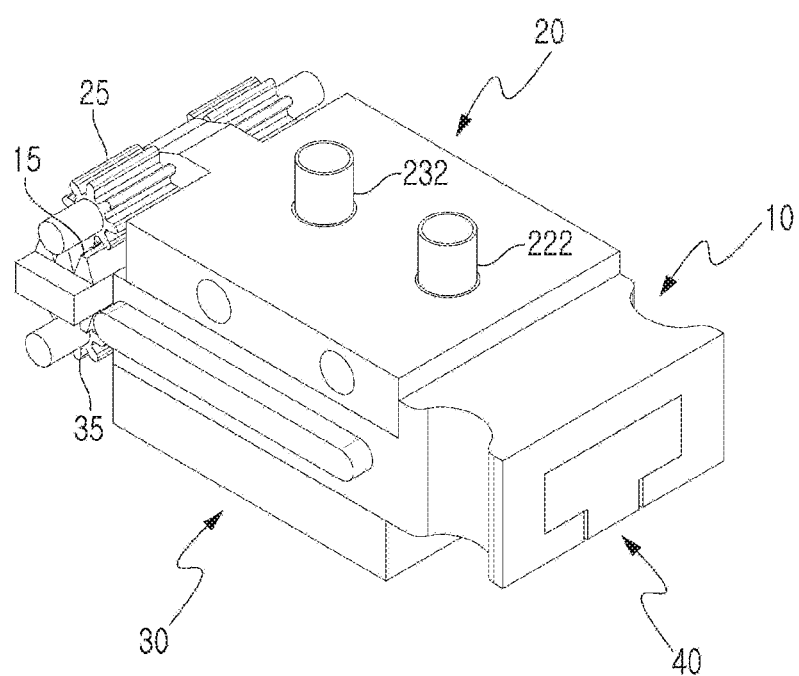
FIG. 1 is a perspective view showing a fluid analysis chamber module according to a preferred embodiment of the present invention.

Hereinafter, embodiments of the present invention will be described in detail with reference to the accompanying drawings. In the following description of the embodiments of the present invention, a detailed description of known functions and configurations will be omitted when it may make the subject matter of the present invention rather unclear.

The present invention provides a fluid analysis chamber module that is adapted to detect a trace amount of a target substance present therein by collecting it while a fluid is flowing into the inside of the analysis element. The fluid analysis chamber module of the present invention employs a configuration that allows convenient and quick replacement of analysis elements. The fluid analysis chamber module can be used to construct a stable inspection system or apparatus by simply mounting the analysis element in the chamber hole and then closing the upper and lower bodies.

In a preferred embodiment, the fluid analysis chamber module of the present invention may include a middle body, an upper body, and a lower body. The middle body has a chamber hole which an analysis element is mounted into, and the upper body and lower body are rotated to be in contact with the upper surface and lower surface of the middle body and to close the chamber hole.

For example, the analysis element has an inner space provided by its housing and has a fluid inlet and outlet in the upper surface thereof. The upper body has a fluid inlet and outlet port units which are connected in fluid communication with the fluid inlet and outlet of the analysis element when the upper body is in contact with the upper surface of the middle body and closes the chamber hole. The lower body has on the upper surface thereof pogo pins which are configured to be connected to electrodes of the analysis element when the lower body is rotated to be in contact with the lower surface of the middle body and close the chamber hole. Preferably, the middle body has a tray receiving opening in its front end through which a tray with the analysis element seated thereon can be inserted and removed in a sliding manner. The tray inserted through the tray receiving opening causes the analysis element seated on the upper surface to be positioned in the chamber hole.

Magnets are disposed at least at two or more of the upper body, middle body, and lower body so that the upper body and lower body in the closed position can be maintained in the closed position. For installation of the magnets, the bodies may be provided with magnet grooves, and the bodies may be made of a magnetic material, but are not limited thereto.

In order to replace the analysis element used in the fluid analysis, the upper and lower bodies are moved to the open position, and the analysis element can be replaced by sliding and detaching the tray. Then, the other required analysis element is placed on the tray and the tray is inserted through the tray receiving opening to perform a new detecting operation.

The upper body and the lower body can be rotated by using the rack/pinion gear set, and the upper body and the lower body can be brought into contact with the upper and lower surfaces of the middle body, respectively, or out of the contact state. When the upper body and the lower body are in contact with the upper and lower surfaces of the middle body, the chamber hole of the middle body is closed and the chamber hole is opened while being separated from the contact state. Here, the position at which the upper body and the lower body respectively contact the upper and lower surfaces of the middle body is referred to as the closed position, and the position at which the upper body and the lower body are separated from the closed positions may be referred to as the open position. Since the pogo pins are connected to the electrodes of the analysis element when the lower body is in the closed position, an analysis system can be constructed without troublesome measures such as wire bonding.

Hereinafter, preferred embodiments of the present invention will be described in detail with reference to the accompanying drawings.

Figure 2:
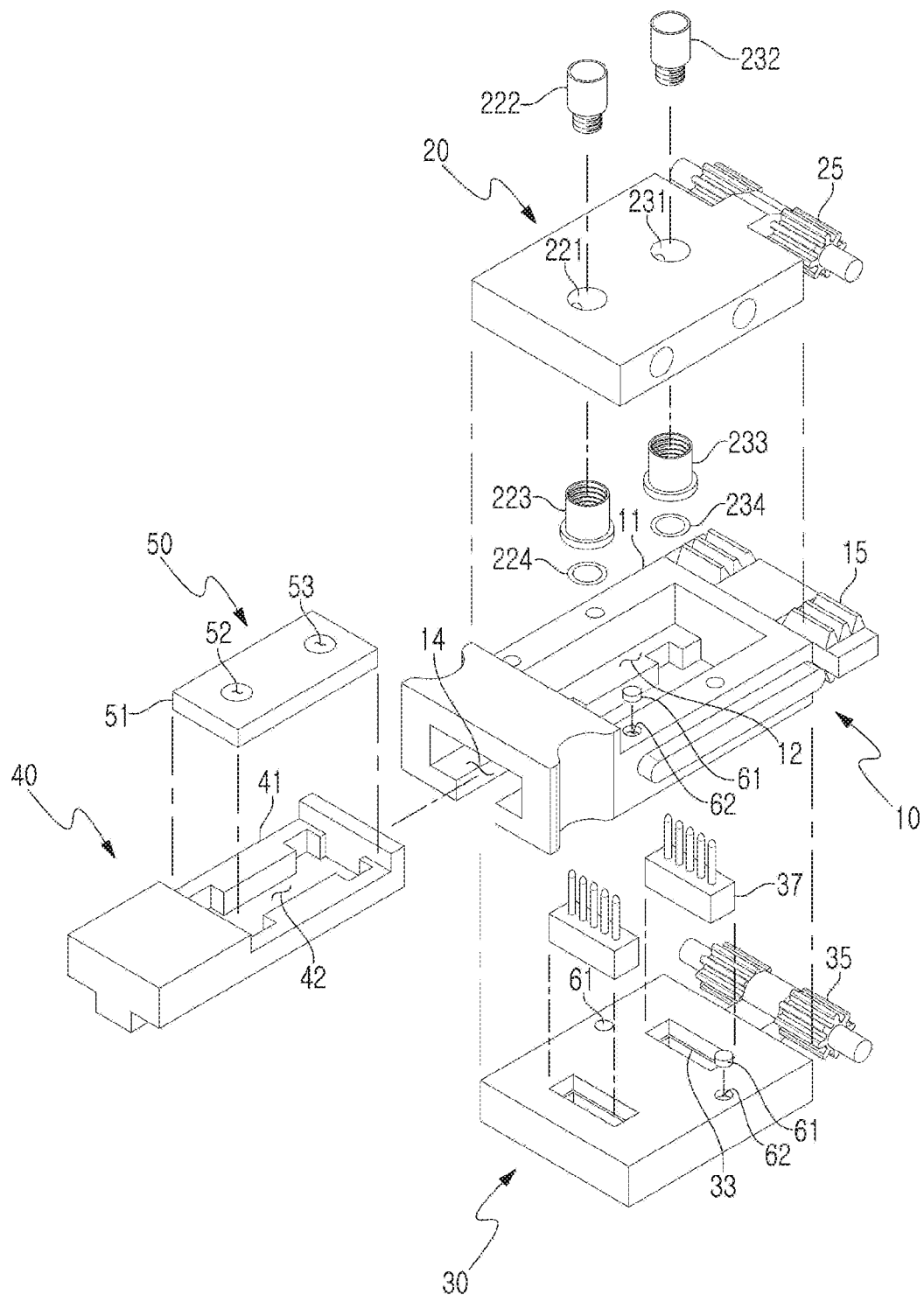
FIG. 2 is an exploded perspective view of the fluid analysis chamber module of FIG. 1.
Figure 3:
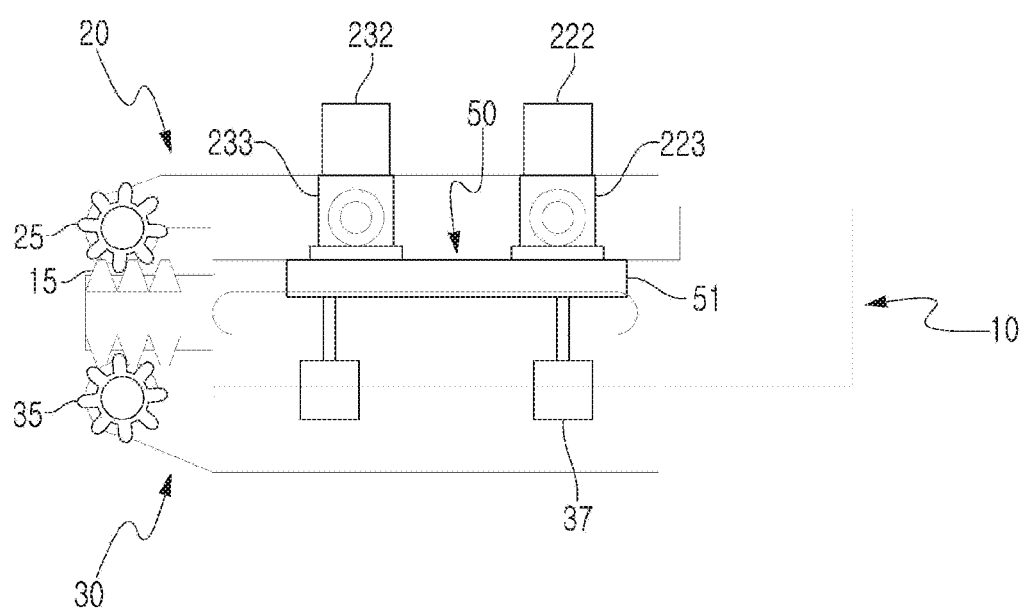
FIG. 3 is a view showing the inside of the fluid analysis chamber module of FIG. 1.
Figure 4:
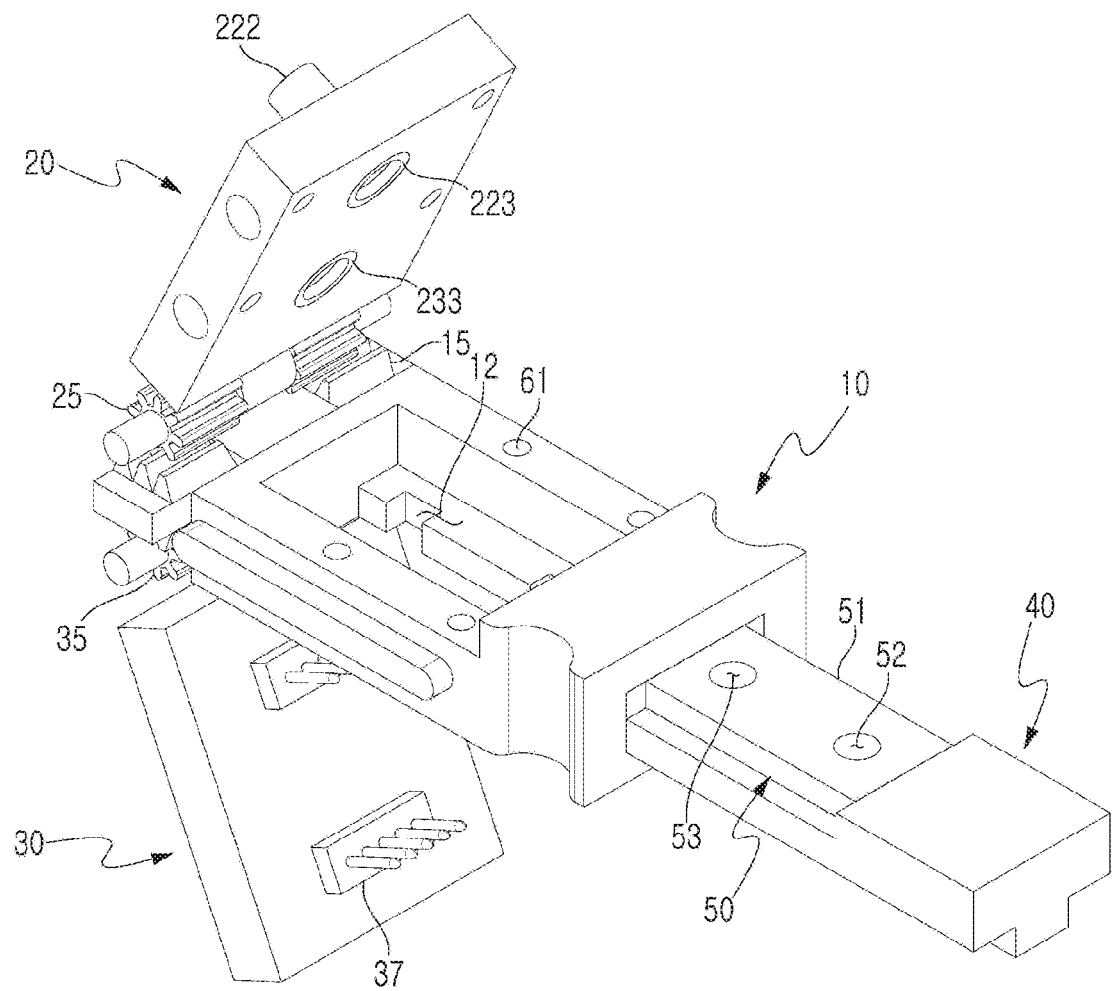
FIGS. 4 and 5 are views showing the open state of the fluid analysis chamber module of FIG. 1.
Figure 5:
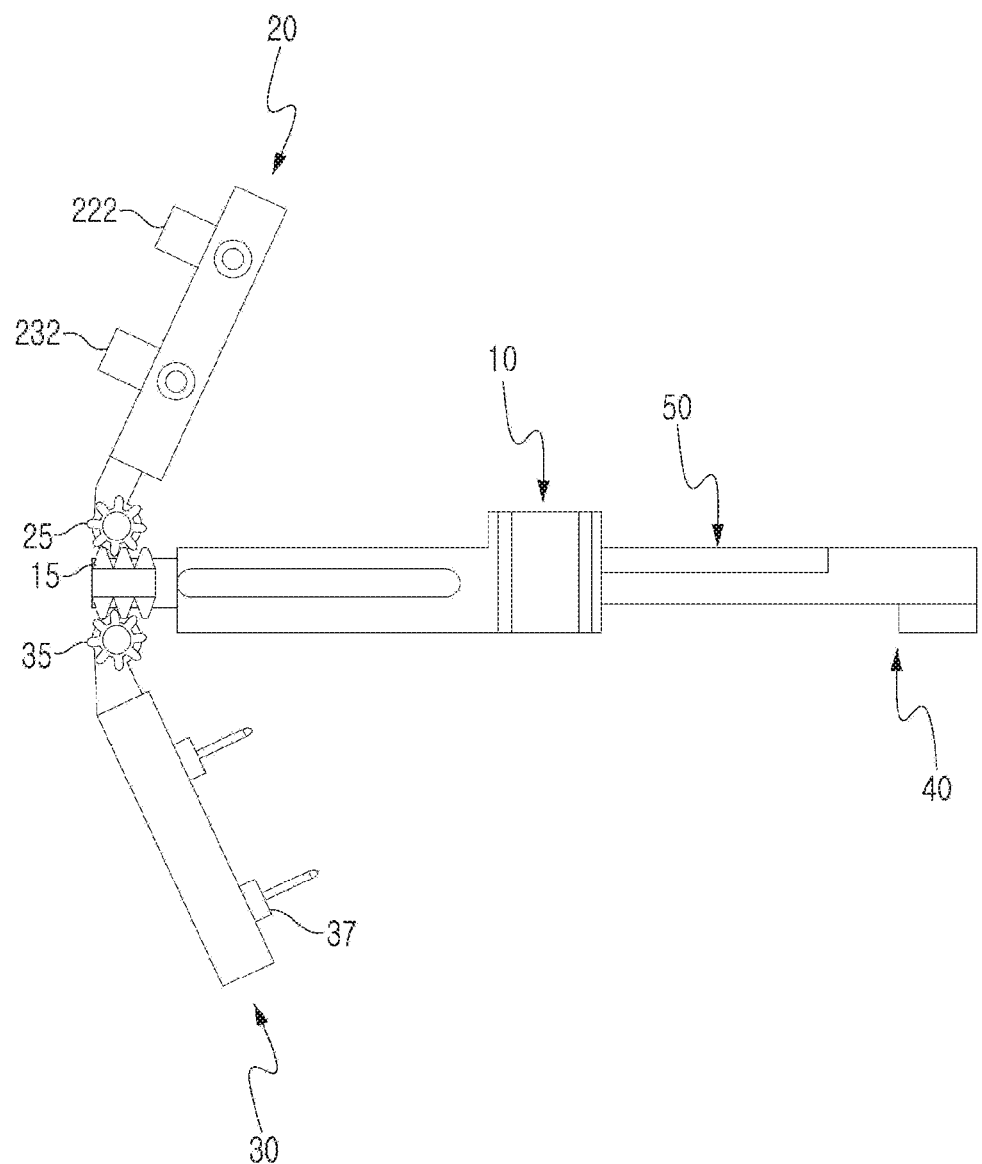

FIG. 1 is a perspective view showing a fluid analysis chamber module according to a preferred embodiment of the present invention. FIG. 2 is an exploded perspective view of the fluid analysis chamber module of FIG. 1. FIG. 3 is a view showing the inside of the fluid analysis chamber module of FIG. 1. FIGS. 4 and 5 are views showing the open state of the fluid analysis chamber module of FIG. 1.

Referring to FIGS. 1-5, a fluid analysis chamber module according to a preferred embodiment of the present invention includes a middle body 10, an upper body 20, and a lower body 30. The middle body 10 has a chamber hole 12 opened in a vertical direction at a central portion of its upper surface 11. The middle body 10 has a tray receiving opening 14 on its front end face, which communicates with the chamber hole 12. When a tray 40 is inserted and mounted into the middle body 10, an analysis element seated on the tray is exposed in the chamber hole 12. The module of the present invention is ready for analysis operation when the chamber hole 12 has been closed by rotating the upper body 20 and the lower body 30 to be contacted to the upper and lower surfaces of the middle body 10 respectively (See FIGS. 3 and 7).

The tray 40 is provided with an analysis element seat 41 on its upper surface, which may preferably be in a shape and size that fit when inserted longitudinally into the tray receiving opening 14 of the middle body 10. The analysis element seat 41 has an opening 42 which is opened upward and downward so that the upper and lower surfaces of the mounted analysis element are exposed. The chamber hole 12 on the middle body 10 may have several stoppers on the inner surface, which allow the tray to be stably seated in the chamber hole 12 without being detached in the chamber hole 12.

The analysis element 50 includes a housing 51 which provides a space therein and provides a fluid inlet 52 and a fluid outlet 53 on the upper surface.

A gear set is disposed at a rear end portion of the middle body 10, and the gear set mechanically and operatively connects the middle body 10, the upper body 20, and the lower body 30.

For example, the upper body 20 and the lower body 30 are rotated about the gear set and contact the upper surface 11 and the lower surface 13 of the middle body 10, respectively. This contacted state can be referred to as a closed position of each of the upper body 20 and the lower body 30.

An example of the gear portion may be a combination of a rack and a pinion. To this end, rack gears 15 may be provided on the upper surface and the lower surface of the rear end side of the middle body 10. The pinion gears 25 and 35 corresponding to the rack gears 15 are provided at the rear end of the upper body 20 and the lower body 30, respectively.

The pinion gear 25 of the upper body 20 is engaged with each of the rack gears 15 on the upper surface of the middle body 10. Accordingly, the upper body 20 can move between the closed position, which is in contact with the upper surface of the middle body 10, and the open position, which is rotated away from the closed position.

The upper body 20 has fluid inlet and outlet port units. These fluid inlet and outlet pot units are in fluid communication with the fluid inlet 52 and the fluid outlet 53 of the analysis element when the upper body 20 pivots and is in the closed position where the upper body 20 is contacted to the upper surface of the middle body 10.

The fluid inlet and outlet port units each have holes 221 and 231 formed in the upper body 20, bolt-type pipes 222 and 232 inserted in the holes, nut-type pipes 223 and 233 inserted in the holes, and sealing members 224 and 234, respectively. The nut-type pipes 223 and 233 may be each inserted into the hole 221 and 231, and the bolt-type pipes 222 and 231 may be each coupled to the nut-type pipes 223 and 233. A part of the bolt-type pipes 222 and 232 protrude above the upper surface of the upper body 20, and elements for supplying fluid from the outside may be coupled to them.

The pinion gear 35 disposed at the rear end side of the lower body 30 is engaged with the rack gear 15 on the lower surface of the middle body 10. Therefore, the lower body 30 can be rotated about the rear end to move between the closed position where it is in contact with the lower surface of the middle body 10 and the open position which it is off the closed position.

The lower body 30 is also provided with a pair of pogo pins 37 on its upper surface to connect to the electrodes of the analysis element 50 when the lower body 30 is in the closed position. The pogo pins 37 may be inserted into the pin mounting holes 33 formed on the upper surface of the lower body 30, respectively.

FIGS. 6A-C and 7A-D are views for explaining the operation for mounting the analysis element in the fluid analysis chamber module according to the preferred embodiment of the present invention. FIGS. 6A-C and 7A-D illustrate the operation of the fluid analysis chamber module according to the preferred embodiment of the present invention in which the chamber is opened and closed to mount or replace the analysis element 50.

FIG. 6A shows that the upper body 20 and the lower body 30 are both in the closed position in contact with the upper and lower surfaces of the middle body 10, respectively. The upper body 20 and the lower body 30 are rotated in the upward direction and the downward direction, respectively, as shown in FIG. 6B in order to mount the analysis element 50. The upper body 20 and the lower body 30 are rotated and moved to the open position by the rack gears 15 and the pinion gears 25 and 35. Then, when the tray 40 is pulled forward as shown in FIG. 6C, the analysis element seat 41 of the tray 40 is opened. At this time, the analysis element 50 can be mounted on the analysis element seat 41 of the tray 40. If the analysis element 50 already used is seated, the used analysis element will be separated and a new analysis element can be then mounted.

When the upper body 20 and the lower body 30 are in the open position and the tray 40 is open to the outside as shown in FIGS. 7A and 7B, a new analysis element 50 can be inserted into the analysis element mounting seat 41 of the tray 40. Subsequently, as shown in FIG. 7C, when the tray 40 is pushed into the tray receiving opening 14, the tray 40 and the analysis element 50 are mounted at analytical positions. Thereafter, as shown in FIG. 7D, when the upper body 20 and the lower body 30 are rotated and closed, the analysis operation can be performed.

The fluid inlet and outlet port units of the upper body 20 are in fluid communication with the analysis element 50 when the upper body 20 and the lower body 30 are in contact with the upper and lower surfaces of the middle body 10 in the closed position, and the pogo pins 37 of the lower body 30 are connected to the electrodes of the analysis element 50.

The fluid inlet and outlet port units of the upper body 20 are in hermetic contact with the fluid inlet 52 and outlet 53 of the analysis element 50 respectively and the pogo pins 37 of the lower body 30 are connected to the electrodes of the analysis element 50.

As a result, the fluid analysis chamber module of the present invention can be easily used while repeatedly replacing the analysis elements without performing troublesome procedures such as sealing of the fluid supply/discharge lines and wire-bondings for electrical/signal connection of the analysis element.

When the upper body 20 and the lower body 30 are in the closed position in contact with the upper and lower surfaces of the middle body 10, the upper body 20 and the lower body 30 may be held by magnets 61 in each of the bodies so as to keep without releasing from the closed positions. The magnets 61 may be inserted into the magnet holes 62 provided in each body.

While the present invention has been particularly shown and described with reference to exemplary embodiments thereof, it is to be understood that the invention is not limited to the disclosed exemplary embodiments.

What is claimed is:

1. A fluid analysis chamber module, comprising:
   a middle body having a chamber hole opened in a vertical direction at a central portion of an upper surface thereof and having a tray receiving opening disposed at a front end thereof;
   a tray having an analysis element seat on an upper surface thereof and capable of being inserted into the chamber hole in a sliding manner through the tray receiving opening so that the seated analysis element is located in the chamber hole;
   an analysis element having a housing with a fluid inlet and an outlet formed on an upper surface thereof;
   an upper body configured to be movable between a closed position in which the upper body is being in contact with the upper surface of the middle body and an open position and having a fluid inlet and outlet port units which are each hermetically connected to the fluid inlet and outlet of the analysis element inserted in the chamber hole when in the closed position; and
   a lower body configured to be movable between a closed position in which the lower body is being in contact with the lower surface of the middle body and an open position.

2. The fluid analysis chamber module according to claim 1, wherein the lower body includes pogo pins disposed on an upper surface thereof, the pogo pins being connected to the analysis element when the lower body is in the closed position.

3. The fluid analysis chamber module according to claim 1, wherein the middle body further includes rack gears provided on an upper surface and a lower surface of a rear end, respectively,
   wherein the upper body and the lower body each include a pinion gear that is engaged with each of the rack gears, wherein the upper body and the lower body rotate through a gear engagement and move between respective closed and open positions.

4. The fluid analysis chamber module according to claim 1, wherein sealing members are disposed at lower ends of the fluid inlet and outlet port units to maintain a sealing when the fluid inlet and outlet port units are in fluid communication with the fluid inlet and the fluid outlet of the housing of the analysis element, respectively.

5. The fluid analysis chamber module according to claim 1, further comprising magnet members disposed in two or more of the middle body, the upper body, and the lower body, the magnet members being configured to maintain the closed positions when the upper body and the lower body are in the closed positions thereof.

* * * * *